US008662580B2

(12) United States Patent
Henke et al.

(10) Patent No.: US 8,662,580 B2
(45) Date of Patent: Mar. 4, 2014

(54) ARM REST WITH DRINKING VESSEL HOLDER

(75) Inventors: Hans Henke, Grosslangheim (DE); Andreas Sulzbacher, Volkach (DE); Kerstin Weckert, Schwarzach (DE)

(73) Assignee: F.S. Fehrer Automotive GmbH (DE)

( * ) Notice: Subject to any disclaimer, the term of this patent is extended or adjusted under 35 U.S.C. 154(b) by 617 days.

(21) Appl. No.: 12/833,617

(22) Filed: Jul. 9, 2010

(65) Prior Publication Data

US 2011/0025105 A1 Feb. 3, 2011

(30) Foreign Application Priority Data

Jul. 30, 2009 (DE) .................. 10 2009 035 694

(51) Int. Cl.
*A47C 7/62* (2006.01)

(52) U.S. Cl.
USPC .................. 297/188.14; 248/311.2; 224/926

(58) Field of Classification Search
USPC ........... 297/188.14; 248/311.2; 224/544, 926; 220/737
See application file for complete search history.

(56) References Cited

U.S. PATENT DOCUMENTS

| 2,215,411 | A | * | 9/1940 | Sebring | 248/311.2 |
| 3,661,350 | A | * | 5/1972 | Eckler et al. | 248/146 |
| 4,697,780 | A | * | 10/1987 | Wenkman et al. | 248/558 |
| 5,060,899 | A | * | 10/1991 | Lorence et al. | 248/311.2 |
| 5,195,711 | A | * | 3/1993 | Miller et al. | 248/311.2 |
| 5,356,107 | A | * | 10/1994 | Sinohuiz | 248/311.2 |
| 5,540,409 | A | * | 7/1996 | Cunningham | 248/311.2 |
| 5,620,228 | A | * | 4/1997 | Ito et al. | 297/188.17 |
| 5,655,742 | A | * | 8/1997 | Whitman et al. | 248/311.2 |
| 5,730,491 | A | * | 3/1998 | Carlsen et al. | 297/188.19 |
| 5,782,448 | A | * | 7/1998 | Withun et al. | 248/311.2 |
| 5,839,711 | A | * | 11/1998 | Bieck et al. | 248/313 |
| 5,897,090 | A | * | 4/1999 | Smith et al. | 248/311.2 |
| 5,938,160 | A | * | 8/1999 | Hartmann et al. | 248/311.2 |
| 6,039,206 | A | * | 3/2000 | DeFrancesco | 220/737 |
| 6,050,468 | A | * | 4/2000 | Kelley | 224/542 |
| 6,217,112 | B1 | | 4/2001 | Linsenmeier et al. | |
| 6,250,527 | B1 | * | 6/2001 | Mizue et al. | 224/281 |
| 6,302,364 | B1 | * | 10/2001 | Chiueh | 248/311.2 |
| 6,637,709 | B1 | * | 10/2003 | Guenther et al. | 248/311.2 |
| 7,036,784 | B2 | * | 5/2006 | Peitzmeier et al. | 248/311.2 |
| 7,147,192 | B2 | | 12/2006 | Kong | |
| 7,234,673 | B2 | * | 6/2007 | Graneto, III | 248/311.2 |
| 7,275,729 | B2 | * | 10/2007 | Sherman et al. | 248/311.2 |
| 7,413,244 | B2 | * | 8/2008 | Tanaka et al. | 296/198 |
| 7,597,300 | B2 | * | 10/2009 | Harada | 248/311.2 |
| 8,353,495 | B2 | * | 1/2013 | Ogura | 248/311.2 |

(Continued)

FOREIGN PATENT DOCUMENTS

DE 29619478 U1 2/1997
DE 29606583 U1 10/1997

(Continued)

*Primary Examiner* — David E Allred
(74) *Attorney, Agent, or Firm* — Quarles & Brady LLP

(57) ABSTRACT

An arm rest with a drinking vessel holder is particularly intended for use as a back center arm rest for integration in the back rest of a vehicle. The need for a soft back rest and at the same time for integration of a drinking vessel holder is satisfied by the aspect that the drinking vessel holder is formed of a soft material in the bottom region. Moreover, the foam body for provision of padding is functionally employed for generating the retaining force required for retaining the drinking vessel.

18 Claims, 4 Drawing Sheets

(56) References Cited

U.S. PATENT DOCUMENTS

| | | | |
|---|---|---|---|
| 8,360,380 B2* | 1/2013 | Soma et al. | 248/311.2 |
| 2001/0030217 A1* | 10/2001 | Corrion et al. | 224/926 |
| 2003/0197104 A1* | 10/2003 | Heybl et al. | 248/311.2 |
| 2004/0021048 A1* | 2/2004 | Schaal | 248/310 |
| 2004/0108428 A1 | 6/2004 | Leopold | |
| 2004/0262481 A1* | 12/2004 | Carnevali | 248/311.2 |
| 2005/0184209 A1* | 8/2005 | Dobos | 248/311.2 |
| 2006/0091143 A1* | 5/2006 | Chantalat | 220/737 |
| 2006/0118688 A1 | 6/2006 | Kong | |
| 2006/0284040 A1* | 12/2006 | Nixon et al. | 248/311.2 |
| 2007/0075205 A1* | 4/2007 | Shin et al. | 248/311.2 |
| 2008/0047967 A1* | 2/2008 | Brunner et al. | 220/737 |
| 2009/0108652 A1* | 4/2009 | Tabata | 297/228 |

FOREIGN PATENT DOCUMENTS

| | | | |
|---|---|---|---|
| DE | 19729689 A1 | | 1/1999 |
| DE | 10043720 A1 | | 4/2002 |
| DE | 202005004257 U1 | | 5/2005 |
| DE | 102005051826 A1 | | 5/2006 |
| DE | 102005019485 A1 | | 11/2006 |
| EP | 1426233 A1 | | 6/2004 |
| JP | 2002144941 A | | 5/2002 |
| JP | 2007083863 | * | 4/2007 |
| JP | 2007152972 A | | 6/2007 |

* cited by examiner

ARM REST WITH DRINKING VESSEL HOLDER

CROSS-REFERENCE TO RELATED APPLICATIONS

This application claims priority to German Patent Application No. 10 2009 035 694.0, filed Jul. 30, 2009, which is fully incorporated herein by reference.

STATEMENT CONCERNING FEDERALLY SPONSORED RESEARCH OR DEVELOPMENT

Not Applicable.

FIELD OF THE INVENTION

The present invention relates to an arm rest with a drinking vessel holder. The arm rest is preferably for arrangement at a seat or a seat bench in a vehicle. The drinking vessel holder extends into the interior of the arm rest, and includes at least one movable retaining element.

BACKGROUND OF THE INVENTION

From vehicle manufacturing, particularly from automobile construction, arm rests are known which are installed at a seat or else at a seat bench. Generic arm rests are also equipped with a drinking vessel holder. Said drinking vessel holders, frequently also referred to as cup holders, are utilized in particular for enabling vehicle occupants to deposit drinking vessels, such as cups, bottles or cans in a simple and secure fashion. As a matter of course, such arm rests with drinking vessel holders can equally be employed in other means of transport, such as airplanes, rail vehicles or ships.

Arm rests with drinking vessel holders known from the state of the art exhibit the characteristic feature that the drinking vessel holder is joined to the arm rest in the form of a module. For the drinking vessel holder, in turn, a plurality of different holder types are known from the state of the art. These holders are generally composed of a base support, a circular receptacle, a bottom and retaining elements which serve to fix the drinking vessel to be accommodated and to ensure a secure hold. For this purpose, a spring force acts upon the holder.

In this context, document DE 100 43 720 A1 discloses a drinking vessel holder with three retaining elements. The retaining elements are joined to the receptacle via a rotational axis. With the aid of a tension spring, the retaining elements are pushed into the direction of the center of the receptacle via an appropriate kinematic mechanism, thusly obtaining the secure fixation of the beverage container. The complicated kinematic mechanism required in this embodiment for generating the relevant retaining forces proves to be problematic.

Document EP 1 426 233 A1, pertaining to a holder for a beverage container, discloses a comparable approach, wherein appropriate retaining elements are likewise pushed against the bottle in response to a spring force. In analogy with the afore-cited document, in this case a base support is required, which features appropriate spring elements attached thereto, these spring elements in turn having suitable retaining elements attached thereto.

A state of the art closely associated with the present invention is disclosed in document DE 296 06 583 U1, wherein it has been achieved for the first time to simplify the generation process of the spring forces to be applied. Here, the beverage container is composed of a receptacle which has a plurality of retaining elements attached thereto. These retaining elements in turn are mounted at a rotational axis and are pushed into the direction of the center of the container by means of an elastic ring enclosing the receptacle. Hence, a comparatively simple construction is available, wherein the spring forces can be applied in a secure and simple manner.

Referring back to the function of the arm rests, rigid arm rests and arm rests being swivelable into different positions are known from the state of the art. All of these arm rests provide the function of adequately enhanced convenience on the part of the person using the seat.

This aspect is of particular relevance in the case of swivelable arm rests which are provided for integration in a back seat bench, wherein said arm rests form a part of the back rest when in the swiveled-up position. In this regard, it is common practice to make provision for an adequate foam padding in case of suitable arm rests which at the same time fulfill the function of a back rest. In particular in this case of application, the integration of a suitable drinking vessel holder proves to be problematic. This results from the fact that the drinking vessel holder has a larger installation depth for accommodating a suitable drinking vessel and hence provides less space for the relevant foam body providing the padding.

In order to solve this problem, document DE 296 19 478 U1 suggests to make provision for a fold-out mechanism including an additional holder. In response to an appropriate fold-out action, the additional holder is positioned above the arm rest, whereas the receptacle having a reduced depth is positioned within the arm rest. This solution, in turn, is afflicted with the disadvantage that a complicated kinematic mechanism is required to realize a suitable holder. By the same token, suitable holders are prone to potential damage, because these holders are manifestly raised above the arm rest surface and hence constitute an obstacle.

SUMMARY OF THE INVENTION

For this reason, it is an object of the present invention to create a generic arm rest with a beverage holder that requires little space, while at the same time ensuring a secure hold of the vessel to be accommodated. It is another object of the present invention to design the holder in the simplest and most cost-efficient manner. This object is attained in one embodiment by providing an inventive arm rest with an upper side having an opening. At least one drinking vessel holder extends from the opening into the interior of the arm rest and which thusly forms a receptacle. The drinking vessel holder includes at least one movable retaining element, wherein the retaining element can come into abutment against the periphery of a drinking vessel. The retaining element is pushed into the direction of the drinking vessel in response to an active force (F) generated by an elastic deformation of a foam body.

In a preferred embodiment, the inventive arm rest firstly is characterized by typical features of this arm rest type. The arm rest concerned firstly relates to a padded arm rest. Hence, the arm rest features a foam body. Besides, a drinking vessel holder is integrated, which is positioned on the upper side so as to ensure the functionality thereof. The basic feature of a drinking vessel holder is constituted by a receptacle, wherein a suitable container can be deposited. In analogy with most embodiments of drinking vessel holders, this recess completely extends within the arm rest. In addition, several retaining elements are utilized, which are distributed along the periphery and which retain the relevant drinking vessel in response to an active force.

In contrast to conventional construction types utilizing an additional component for generating the active force, for this purpose, the already provided foam body is utilized. In this regard, the inventive feature is constituted by the elastic deformation of the foam body at the back of the retaining elements, resulting in the generation of the accordingly necessary active force. By means of selecting the shape of the foam body it is ensured that a force acts upon the retaining elements already in the initial position, i.e. when no container is accommodated in the receptacle, so that the retaining elements are hence secured free of clearance subject to a certain amount of pre-stressing.

Padded arm rests are employed in particular as center arm rests, which in turn form a part of the back rest of the back seat bench. As a consequence, said arm rests are mounted so as to be swivelable, resulting in that the arm rest firstly is used as an arm rest and secondly may serve as a back rest as well. Thus, on the one hand provision is made for the swiveled-down support position, wherein the corresponding upper side points into the interior, hence ensuring the arm rest functionality. On the other hand, provision is made for the swiveled-up rest position, wherein the front side, which has the relevant padding for ensuring the required convenience on the part of the person using the seat, points into the interior. The upper side and the front side hence are inevitably positioned on opposite sides of the arm rest.

In addition, the inventive design of the drinking vessel holder is characterized by the aspect that it features a bottom, wherein this bottom is closed and features a peripheral rim. This results in a minimized receiving volume which serves to collect spilled liquid and to prevent penetration into the padding.

For the purpose of extra convenience and to provide an additional safety feature, the bottom and the adjoining rim are made of an elastic material. This material may be a conventional TPE or TPU material, but other materials are equally conceivable. In spite of the reduced installation space remaining between the bottom of the drinking vessel holder and the front side, both a high degree of convenience can thusly be ensured and the necessary resilience is provided when the head bumps against the area at the back of the drinking vessel holder.

It is still another feature of the inventive design that the retaining elements are integrally joined to the bottom. Hence, an insert is formed, which on the one hand is easy to manufacture and which on the other hand provides special advantages in terms of assembly. For manufacture, preferably a two-component injection molding process may be contemplated. In this process, in the abutment region of the beverage container at the retaining elements, a predominantly solid plastic material is utilized. In this regard, conventional plastic materials, such as PP, PE, PA, ABS materials or the like can be utilized. By means of this selection it is guaranteed that the beverage container can be readily inserted. In contrast hereto, the selection of a soft plastic material, such as a TPE or TPU material, would cause the retaining element to strongly adhere to the beverage container, so that the insertion would be performed in a jerky fashion. In contrast hereto, a suitably soft material is utilized especially at the bottom as well as in the peripheral region.

Particularly simple assembly can be ensured in particular by the aspect that the insert, which features the corresponding retaining elements and the bottom, can be mounted in an inner frame, and an outer frame is subsequently sleeved thereon. Hence, the insert is fixed in its spatial position.

For defining the range of clearance of the retaining elements, the retaining elements each feature a rotational axis. Insofar as the advantageous resilience of the bottom can be dispensed with, the insert, as a rule, will be composed of one material only. In such instances, it is advantageous to form the rotational axis with the aid of a film hinge. In the preferred embodiment with a soft bottom, it is advantageous if the rotational axis is formed by laterally protruding webs. In this case, the solid material component extends from the abutment region up to the webs. Underneath the webs, provision is accordingly made for the soft region. Hence, movability of the retaining element relative to the bottom can be ensured. The corresponding webs are advantageously supported between the inner and the outer frame. Thus, said webs practically form the fixation of the insert between the inner and the outer frame. In both variations described, i.e. an insert made of a material with a film hinge or made of a solid-soft combination, the integral design results in a reduced restoring force acting upon the retaining elements in the direction of the initial position thereof. However, it is the foam body which is essential for ensuring the functionality of the retaining elements.

It is a characterizing feature that the foam body generates the active force acting upon the retaining elements. To this end, the foam body in the unmounted state has a portion overlapping with the retaining elements. During assembly, the relevant foam body is pushed back and hence generates the corresponding force acting upon the retaining elements. In order to limit the path of the retaining elements into the free volume of the insert, the relevant retaining elements feature a peripheral narrow frame. This frame in turn rests against the inner frame part.

For better distribution of forces of the pushing action exerted upon the retaining element, the foam body preferably is provided with a film.

For better and more uniform securing of the beverage container to be accommodated, preferably at least four retaining elements are utilized and are uniformly distributed along the periphery. A relevant difference to the available solution using for instance the elastic ring, can be seen in that as a result of this design of the drinking vessel holder it is possible to make provision for indentations between the individual retaining elements, in order to be able for instance to accommodate a cup with a handle. Here, the indentation preferably extends close to the bottom and extends over three-fourths of the height from the upper side to the bottom.

BRIEF DESCRIPTION OF THE DRAWINGS

An advantageous embodiment of the present invention is schematically illustrated in the following drawings and is explained hereinafter by way of example.

In the drawings.

DETAILED DESCRIPTION OF THE PREFERRED EMBODIMENT

Figure 1:
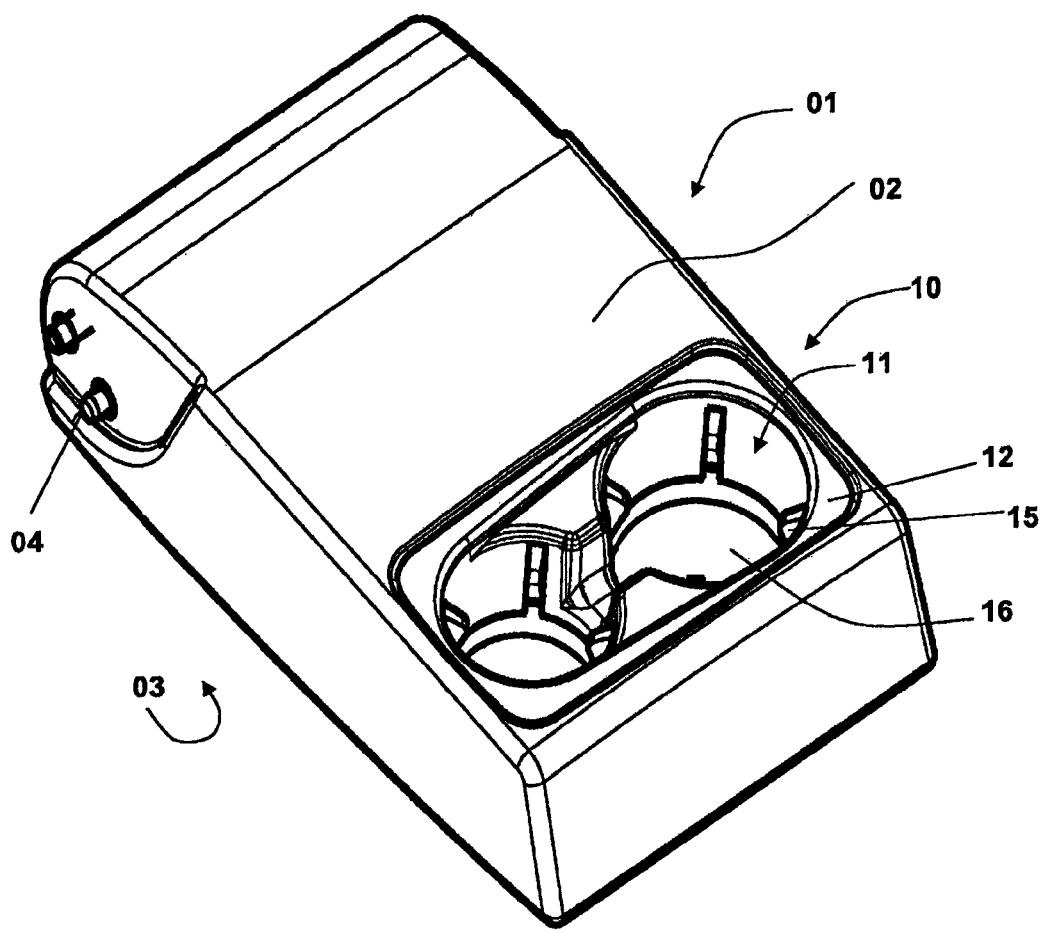
FIG. 1 illustrates an arm rest 01 with a drinking vessel holder 10 in the swiveled-down support position in a perspective top view.

FIG. 1 illustrates an arm rest 01 which is intended for use as a part of a back rest in a vehicle. This perspective view illustrates the arm rest 01 in a swiveled-down support position. In this case, the upper side 02 points into the interior of the vehicle and upwards. The front side 03 of the arm rest 01, which is located opposite the upper side 02 and hence below the illustration of FIG. 1, is not illustrated in the drawings. The front side 03 forms a part of the back rest which is available in the swiveled-up rest position. The swiveling movement of the arm rest 01 is enabled via an integrated axis 04.

The relevant drinking vessel holder 10 is integrated in the frontal region of the arm rest 01. In this case, two drinking vessel holders allocated to each other are provided. These holders are intended for accommodation of for instance cans or bottles or else cups. The drinking vessel holder terminates with the upper side 02 of the arm rest 01 and thusly extends into the interior of the arm rest 01. With the aid of the drinking vessel holder 10, a circular receptacle 11 is thusly created, which is closed downwards by a suitable bottom 16. Between the two drinking vessel holders 10 provision is made for an indentation 20 which is intended for providing the required space for the handle of a cup.

Figure 2:
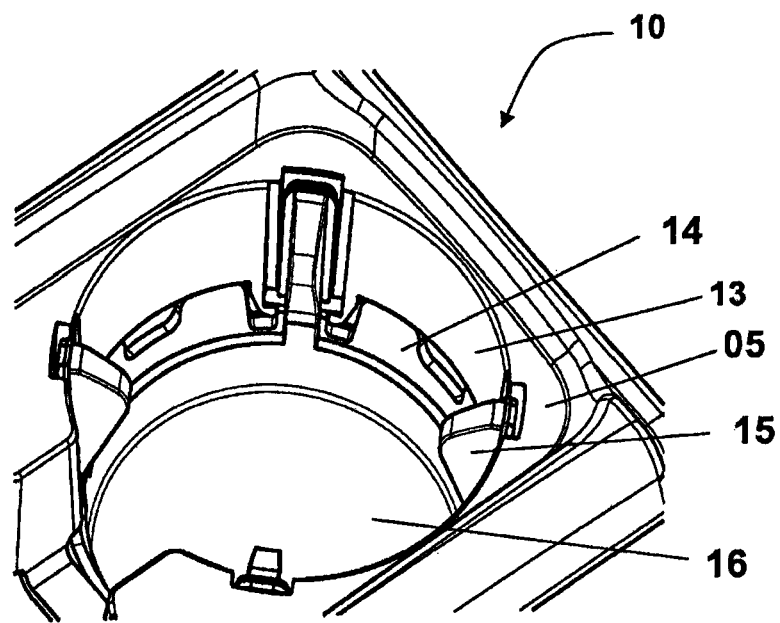
FIG. 2 illustrates a detailed view of the drinking vessel holder 10 without the outer frame 12.

FIG. 2 illustrates the drinking vessel holder 10, however, without the outer frame part 12. The cover of the upper side 02, which is cut in a rectangular shape for the drinking vessel holder 10, extends along the outer periphery. Between the drinking vessel holder 10 and the cover, the foam body 05 is discernible. This foam body is limited in the region of the receptacle 11 by the inner frame 13 and by the insert 14 in the bottom region. In this way, the inner frame 13 forms a ring and the bottom 16 with the adjoining region forms a cup. Starting from the bottom 16, the retaining elements 15 extend upwards and into the free volume of the receptacle 11.

Figure 3:
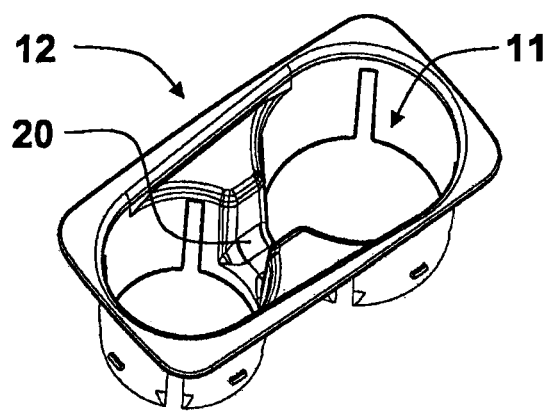
FIG. 3 illustrates a perspective view of the outer frame 12.

FIG. 3 illustrates the outer frame 12 which is mounted into and via the inner frame 13 and the insert 14. This frame is opened downwards and thusly forms an annular receptacle 11. For the retaining elements 15 protruding into the free volume of the receptacle 11, the outer frame 12 is provided with appropriate slots. The upper edge of the outer frame 12 terminates with the upper side 02 of the arm rest 01.

Figure 4:
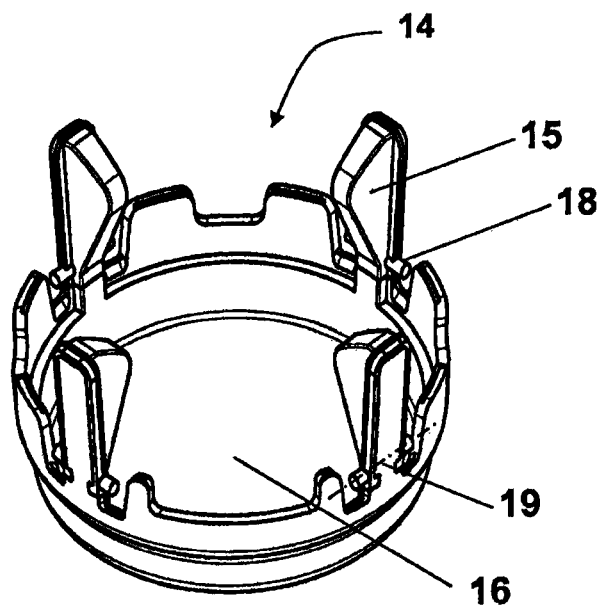
FIG. 4 illustrates a perspective view of the insert 14 with retaining elements 15 and bottom 16.

FIG. 4 shows the inventive insert 14 composed of a bottom 16 with an adjoining rim and four retaining elements 15. The illustrated embodiment shows the variation with a solid-soft combination, wherein the abutment region 17 relative to the container is made of a solid material, which is inserted downwards to the webs 18, and the remainder is made of a soft material. Hence, it is readily discernible that each retaining element 15 is provided with an appropriate rotational axis 19 passing through the webs 18. As a result, displacement of a retaining element 15 results in an elastic deformation of the soft region underneath the rotational axis 19. Due to the design with a bottom 16 having an adjoining rim, a small receiving volume is created which makes it possible to collect spilled liquid. Hence, penetration of liquid into the foam body 05 is prevented.

Figure 5:
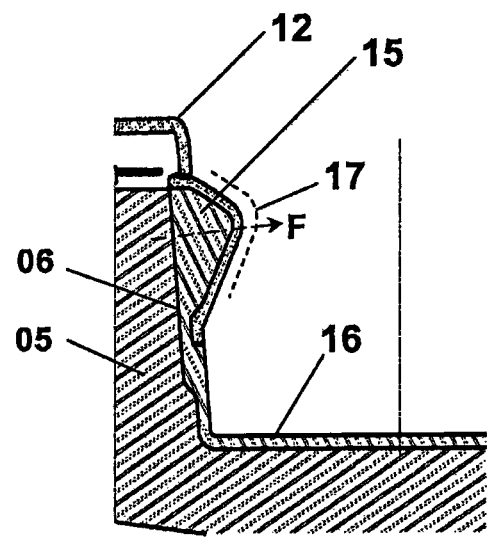
FIG. 5 illustrates a sectional view through the center of the retaining elements 15.

FIG. 5 illustrates a sectional view through the center of a retaining element 15. Here, the effect of the inventive design is clearly apparent. The foam body 05 is located at the back of the retaining element 15 and underneath the insert 14. If a beverage container is now inserted into the drinking vessel holder 10, the relevant retaining elements 15 are pushed to the outside and the foam body 05 is consequently compressed. The foam body 05 compressed in this way in turn gives rise to a reactive force, which generates the required active force F and thusly the retaining force for the beverage container. Moreover, the separation between the solid-soft-component in the insert 14 is apparent. The abutment region 17, which may get into contact with the beverage container, is designed as a solid component, whereas the remainder of the insert 14 is composed of a soft material. For enhancement of the distribution of forces from the retaining element 15 to the foam body 05, the foam body 05 is preferably covered with a thin film 06.

Figure 6:
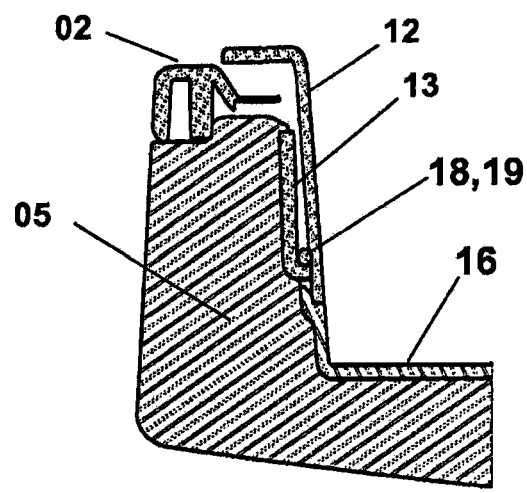
FIG. 6 illustrates a sectional lateral view through the retaining elements 15 in the region of the webs 18.

FIG. 6 in turn illustrates a sectional view through the retaining element 15 in the region of the webs 18. Of the retaining element 15 merely the section through the web 18 is discernible. However, here the connection of the inner frame 13 which carries the web 18 and the outer frame 12 is discernible.

Figure 7:
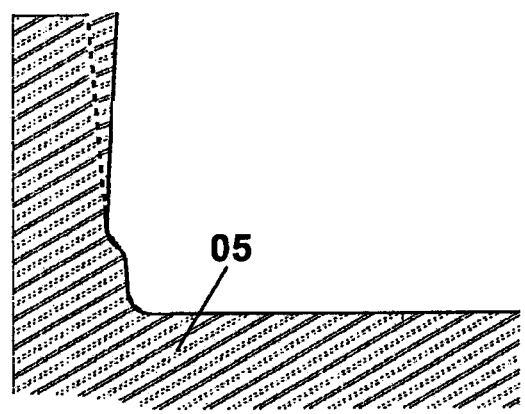
FIG. 7 illustrates a sectional view through the foam body 05 in a state prior to assembly.

In FIG. 7, the foam body 05 is sketchily illustrated in a state prior to assembly. It is rendered apparent that the foam body 05 needs to be pushed into its initial position in the mounted state already in the assembly. Hence, it is ensured that the retaining element 15 is always subjected to a sufficiently large pressing force, and that the retaining element 15 is hence arranged in the beverage holder free of clearance. For limitation of the path of the retaining element 15 into the free volume of the receptacle 11, the retaining element 15 has a narrow rim, as can be seen in FIG. 4, and with said rim rests against the outer frame 12, as can be seen in FIG. 3, if the recess for the retaining element 15 is narrower than the rim at the retaining element 15.

The invention claimed is:

1. An arm rest for arrangement at a seat or a seat bench in a vehicle, said arm rest comprising:
   an upper side having an opening;
   a foam body;
   at least one drinking vessel holder extending from the opening into the foam body and receiving an insert; and
   at least one movable retaining element integrally forming part of said insert and engaging said foam body, said at least one moveable retaining element being moveable about a rotational axis formed by webs laterally protruding from both sides of the at least one moveable retaining element, wherein the foam body urges the retaining element towards a drinking vessel disposed in the at least one drinking vessel holder in response to an active force (F), wherein at least a part of the active force (F) acting upon the retaining element is generated by an elastic deformation of the foam body.

2. The arm rest according to claim 1, in which the arm rest is swivelably arranged on an axis between a swiveled-down support position and a swiveled-up rest position, and wherein the arm rest has a padded front side being opposed to the upper side, wherein the padding of the front side is formed primarily by the foam body, wherein the upper side is directed towards the interior of the vehicle when in the swiveled-down support position, and wherein the front side forms a part of a seat area when in the swiveled-up rest position and is directed to the interior of the vehicle.

3. The arm rest according to claim 1, in which the drinking vessel holder has a bottom to support the drinking vessel to be accommodated.

4. The arm rest according to claim 3, in which the bottom is closed, has a rim and hence has a receiving volume.

5. The arm rest according to claim 3, in which the front side of the arm rest exhibits a particularly high resilience which is enhanced by the bottom and the rim, said bottom and rim being composed of an elastic material selected from a group consisting of TPE and TPU.

6. The arm rest according to claim 3, in which the bottom is integrally joined to the retaining element and thusly forms an insert.

7. The arm rest according to claim 6, in which the insert is mounted between an outer frame and an inner frame.

8. The arm rest according to claim 7, in which a rotational axis is provided for swivelable mounting of the retaining element at the drinking vessel holder.

9. The arm rest according to claim 8, in which the rotational axis is formed by a film hinge.

10. The arm rest according to claim 6, in which the insert is made of a two-component material, wherein a predominantly solid plastic material is inserted at the retaining element in an abutment region of the beverage container, and an elastic material selected from a group consisting of TPE and TPU, is utilized at least in another region defined by a space between the abutment region and the bottom.

11. An arm rest for arrangement at a seat or a seat bench in a vehicle, said arm rest comprising:
an upper side having an opening;
a foam body;
at least one drinking vessel holder extending from the opening into the foam body, said drinking vessel holder including at least one movable retaining element engaging said foam body, said at least one moveable retaining element being moveable about a rotational axis formed by webs laterally protruding from both sides of the at least one moveable retaining element, wherein the foam body urges the retaining element towards a drinking vessel disposed in the at least one drinking vessel holder in response to an active force (F), wherein at least a part of the active force (F) acting upon the retaining element is generated by an elastic deformation of the foam body.

12. The arm rest according to claim 11, in which the webs at the retaining element rest against the inner frame, and the webs are fixed by the outer frame.

13. The arm rest according to claim 1, in which the foam body in the mounted state exerts a pressing force upon the retaining element.

14. The arm rest according to claim 1, in which the path of the retaining element into the free interior is limited by a supporting action of the retaining element at a frame part.

15. The arm rest according to claim 1, in which the retaining element directly abuts against the foam body, wherein a film is provided on a surface of the foam body.

16. The arm rest according to claim 1, in which at least four retaining elements are utilized in the drinking vessel holder and said retaining elements are uniformly distributed along a periphery of a receptacle defined by the drinking vessel holder to receive the drinking vessel.

17. The arm rest according to claim 16, in which an indentation is provided in the periphery of the receptacle at least between two retaining elements.

18. An arm rest for arrangement at a seat or a seat bench in a vehicle, said arm rest comprising:
a padding in the form of a foam body;
at least one drinking vessel holder extending into said foam body and receiving an insert; and
at least one movable retaining element integrally forming part of said insert and extending into said at least one drinking vessel holder for engagement with a drinking vessel, said at least one moveable retaining element being moveable about a rotational axis formed by webs laterally protruding from both sides of the at least one moveable retaining element, and wherein the retaining element is urged against the drinking vessel by an active force (F), wherein at least a part of the active force (F) urging the retaining element against the drinking vessel is generated by elastic deformation of the foam body.

* * * * *